(12) United States Patent
Yang et al.

(10) Patent No.: US 10,770,961 B2
(45) Date of Patent: Sep. 8, 2020

(54) POWER CONVERTER WITH ADJUSTABLE RAMP

(71) Applicant: M3 Technology Inc., Taipei (TW)

(72) Inventors: Bo Yang, Allen, TX (US); Xiaoyu Xi, Dallas, TX (US); David Meng, Los Altos, CA (US)

(73) Assignee: M3 Technology Inc., Taipei (TW)

( * ) Notice: Subject to any disclaimer, the term of this patent is extended or adjusted under 35 U.S.C. 154(b) by 0 days.

(21) Appl. No.: 15/953,768

(22) Filed: Apr. 16, 2018

(65) Prior Publication Data

US 2019/0319526 A1   Oct. 17, 2019

(51) Int. Cl.
*H02M 1/08* (2006.01)
*H02M 3/155* (2006.01)
*H02M 1/00* (2006.01)

(52) U.S. Cl.
CPC ............ *H02M 1/08* (2013.01); *H02M 3/155* (2013.01); *H02M 2001/0025* (2013.01)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569
USPC ................................. 323/271, 273–285, 288
See application file for complete search history.

(56) References Cited

U.S. PATENT DOCUMENTS

| | | | | |
|---|---|---|---|---|
| 2007/0182395 A1* | 8/2007 | Sakai | ................. | H02M 3/1588 323/283 |
| 2008/0129264 A1* | 6/2008 | Moussaoui | ........... | H02M 3/156 323/283 |
| 2010/0253309 A1* | 10/2010 | Xi | ......................... | H02M 3/156 323/288 |
| 2011/0215771 A1* | 9/2011 | Chang | ...................... | H02J 7/00 320/166 |
| 2013/0187624 A1* | 7/2013 | Wakasugi | ............. | H02M 3/158 323/282 |
| 2014/0292299 A1* | 10/2014 | Yang | .................... | H02M 3/1588 323/288 |
| 2014/0306679 A1* | 10/2014 | Tseng | .................... | H02M 3/156 323/285 |
| 2016/0036327 A1* | 2/2016 | Nam | ...................... | H02M 3/156 323/271 |
| 2016/0204702 A1* | 7/2016 | Padyana | ................. | H02M 1/15 323/271 |

* cited by examiner

*Primary Examiner* — Bryan R Perez
(74) *Attorney, Agent, or Firm* — Slater Matsil, LLP

(57) ABSTRACT

A power converter comprises a first switch and a second switch connected in series between an input power source and ground, an inductor connected between a common node of the first switch and the second switch, and an output capacitor, a control apparatus comprising a feedback control apparatus and an ramp generator, wherein the ramp generator is configured to dynamically adjust an amplitude of a ramp based upon different operating conditions, an on-time control generator and a latch having a set input configured to receive an output signal of the control apparatus and a reset input configured to receive an output signal of the on-time control generator.

20 Claims, 9 Drawing Sheets

POWER CONVERTER WITH ADJUSTABLE RAMP

TECHNICAL FIELD

The present invention relates to a control scheme of a power converter, and, in particular embodiments, to a power converter employing a constant on-time control scheme with an adjustable ramp.

BACKGROUND

As technologies further advance, a variety of electronic devices, such as mobile phones, tablet PCs, digital cameras, MP3 players and/or the like, have become popular. Each electronic device requires direct current power at a substantially constant voltage which may be regulated within a specified tolerance even when the current drawn by the electronic device may vary over a wide range. In order to maintain the voltage within the specified tolerance, a power converter (e.g., a switching dc/dc converter) coupled to the electronic device provides very fast transient responses, while keeping a stable output voltage under various load transients.

Hysteretic-based power converter control schemes such as the constant on-time scheme can enable power converters to provide fast transient responses. A buck converter employing the constant on-time control scheme may only comprise a feedback comparator and an on-timer. In operation, the feedback circuit of the power converter (e.g., buck converter) directly compares a feedback signal with an internal reference. When the feedback signal falls below the internal reference, the high-side switch of the power converter is turned on and remains on for the on-timer duration. As a result of turning on the high side switch, the inductor current of the power converter rises. The high-side switch of the power converter turns off when the on-timer expires, and does not turn on until the feedback signal falls below the internal reference again. In summary, when the constant on-time control scheme is employed in a power converter, the on-time of the high-side switch of the power converter is terminated by the on-timer. The off-time of the high-side switch of the power converter is terminated by the feedback comparator.

The power converters employing the constant on-time control scheme are simple to design. However, the constant on-time control scheme has an unwanted instability issues such as a sub-harmonic oscillation at the output voltage. The sub-harmonic oscillation may be caused by insufficient ESR (equivalent series resistance) of the output capacitor. The sub-harmonic oscillation may generate an excessive ripple voltage at the output of the power converter. Such an excessive ripple voltage is not preferable in many applications.

In order to avoid the sub-harmonic oscillation, a voltage ramp is injected into the feedback circuit to solve this instability issue. The voltage ramp may be implemented as an internal ramp such as a sensed current signal or an external ramp such as a voltage ramp generated by charging a ramp capacitor with a constant current source.

The voltage ramp has a significant impact on the operation of the power converter. More particularly, a large ramp signal is able to improve the stability of the power converter. On the other hand, a small ramp signal helps to improve the transient response of the power converter.

It would be desirable to provide an apparatus and/or a method for enabling the power converters employing the constant on-time control scheme to have a suitable ramp signal so as to achieve both stable operations and fast transient responses under a variety of operating conditions.

SUMMARY

In particular embodiments, a control scheme may achieve fast transient responses and improve the performance of a hysteretic-based power converter under a variety of operating conditions.

In accordance with an embodiment, a device comprises a first switch and a second switch connected in series between a bias power supply and ground, a first ramp resistor, a first ramp capacitor and a second ramp capacitor connected in series between a common node of the first switch and the second switch and ground and a ramp adjustment apparatus connected to a common node of the first ramp resistor and the first ramp capacitor, wherein the ramp adjustment apparatus is configured to adjust an amplitude of a ramp across the second ramp capacitor.

In accordance with another embodiment, a method comprises monitoring a direct current (dc) voltage level of a dc blocking capacitor of a ramp generator of a power converter, wherein a ramp of the power converter is generated across a ramp capacitor of the ramp generator, providing a supply current flowing from an output of a first amplifier to the dc blocking capacitor and the ramp capacitor when the dc voltage level of the dc blocking capacitor is less than a first predetermined voltage threshold and providing a sink current flowing from the ramp capacitor and the dc blocking capacitor to an output of a second amplifier when the dc voltage level of the dc blocking capacitor is greater than a second predetermined voltage threshold.

In accordance with yet another embodiment, a converter comprises a first switch and a second switch connected in series between an input power source and ground, an inductor connected between a common node of the first switch and the second switch, and an output capacitor, a control apparatus configured to generate gate drive signals for the first switch and the second switch, wherein the control apparatus comprises a feedback control apparatus and a ramp generator, wherein the ramp generator is configured to dynamically adjust an amplitude of a ramp based upon different operating conditions, an on-time control generator and a latch having a set input configured to receive an output signal of the control apparatus and a reset input configured to receive an output signal of the on-time control generator.

An advantage of a preferred embodiment of the present disclosure is improving a power converter's performance through adjusting an amplitude of a ramp of the power converter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a power converter having an adjustable ramp. The invention may also be applied, however, to a variety of power converters. Hereinafter, various embodiments will be explained in detail with reference to the accompanying drawings.

Figure 1:
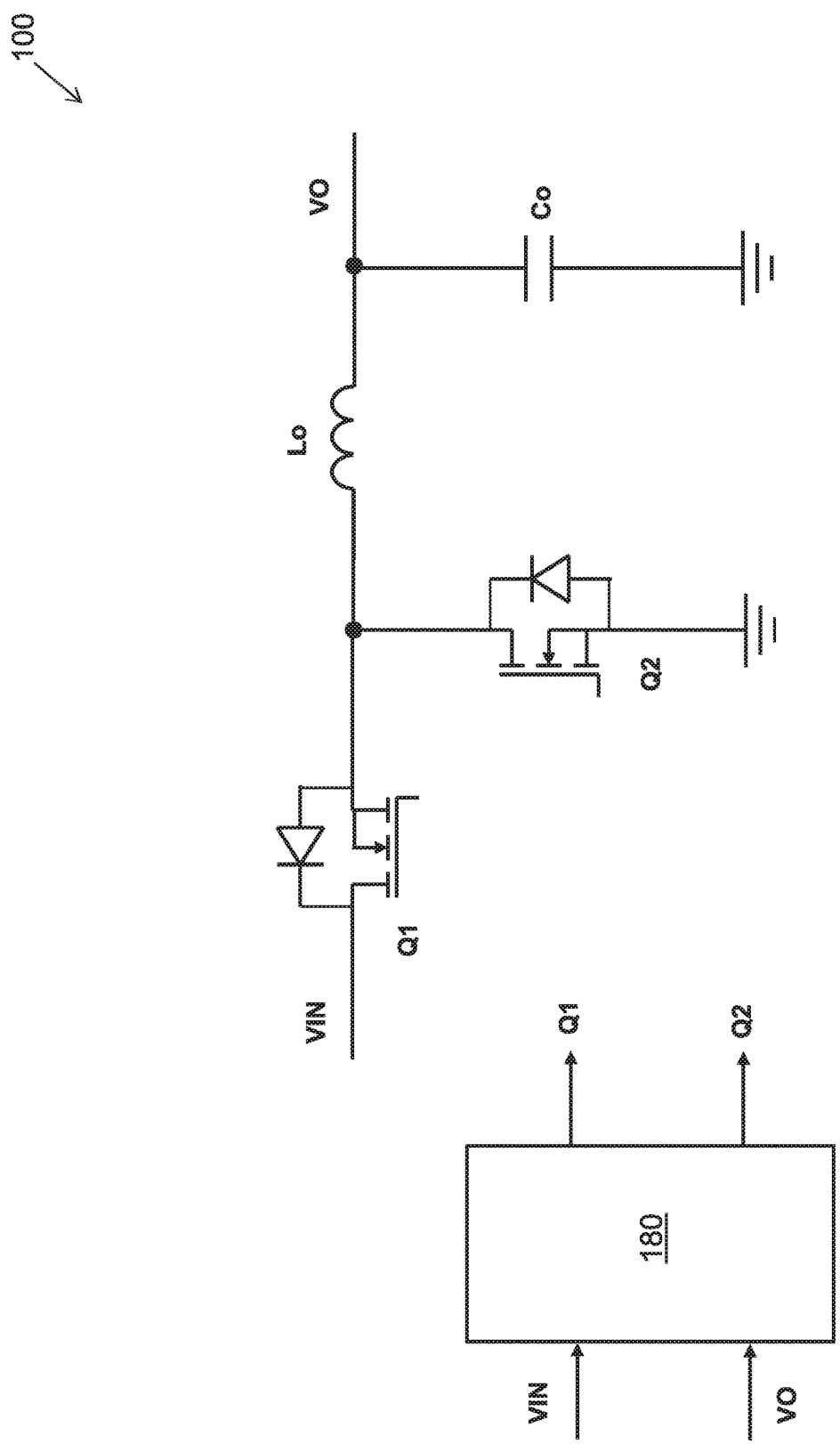
FIG. 1 illustrates a block diagram of a control apparatus of a power converter in accordance with various embodiments of the present disclosure.

FIG. 1 illustrates a block diagram of a control apparatus of a power converter in accordance with various embodiments of the present disclosure. The power converter 100 is a step-down power converter (also known as a buck converter). The operation of the power converter 100 is controlled by a control apparatus 180.

As shown in FIG. 1, the power converter 100 includes a first switch Q1, a second switch Q2, an inductor Lo and an output capacitor Co. As shown in FIG. 1, the first switch Q1 and the second switch Q2 are connected in series between an input power source VIN and ground. The inductor Lo is connected between the common node of the first switch Q1 and the second switch Q2, and the output capacitor Co. Throughout the description, the first switch Q1 may be alternatively referred to as a high-side switch of the power converter 100. Likewise, the second switch Q2 may be alternatively referred to as a low-side switch of the power converter 100.

In some embodiments, the power converter 100 is implemented as a constant on-time power converter. In alternative embodiments, the power converter 100 may be implemented as other suitable power converters such as a constant off-time power converter. Furthermore, the constant on-time control is merely an example. A person skilled in the art would understand, depending on different applications and design needs, other suitable control mechanisms may be applicable to the power converter 100.

The first switch Q1 and the second switch Q2 are implemented as n-type transistors as shown in FIG. 1. The gate of the first switch Q1 and the gate of the second switch Q2 are controlled by a control apparatus 180.

It should be noted that the power converter 100 shown in FIG. 1 is merely an example, which should not unduly limit the scope of the claims. One of ordinary skill in the art would recognize many variations, alternatives, and modifications. For example, the first switch Q1 may be implemented as a p-type transistor. Furthermore, the switch of the power converter 100 (e.g., the first switch Q1) may be implemented as a plurality of n-type transistors connected in parallel.

In some embodiments, the control apparatus 180 may apply a constant on-time control scheme to the power converter 100. In addition, under different operation conditions, the control apparatus 180 may apply an adjustable ramp to the feedback control circuit so as to achieve stable operations and fast transient responses. More particularly, the control apparatus 180 may comprise a ramp generator comprising a ramp capacitor and a direct-current (dc) blocking capacitor connected in series. The ramp signal is generated across the ramp capacitor. The ramp signal is fed into the feedback control circuit to improve the stability of the power converter 100.

In operation, the ramp generator supplies an extra charge current applied to the ramp capacitor and the dc blocking capacitor when a dc voltage level of the dc blocking capacitor is less than a first predetermined threshold. On the other hand, the ramp generator may provide an extra discharge current applied to the ramp capacitor and the dc blocking capacitor when the dc voltage level of the dc blocking capacitor is greater than a second predetermined threshold. Both the first predetermined threshold and the second predetermined threshold are selected based upon design needs and different applications. As a result, the dc voltage level of the dc blocking capacitor and the amplitude of the ramp signal are maintained the same or in a narrow range under a variety of operating conditions. The detailed operation principle of adjusting the ramp amplitude will be described below with respect to FIGS. 4-6.

As shown in FIG. 1, the control apparatus 180 is configured to receive the input voltage VIN and the output voltage Vo. Based upon the output voltage Vo and/or the input voltage VIN, the control apparatus 180 generates two gate signals for controlling the operation of the power converter 100. The detailed operation of the control apparatus 180 will be described below with FIGS. 2-9.

Figure 2:
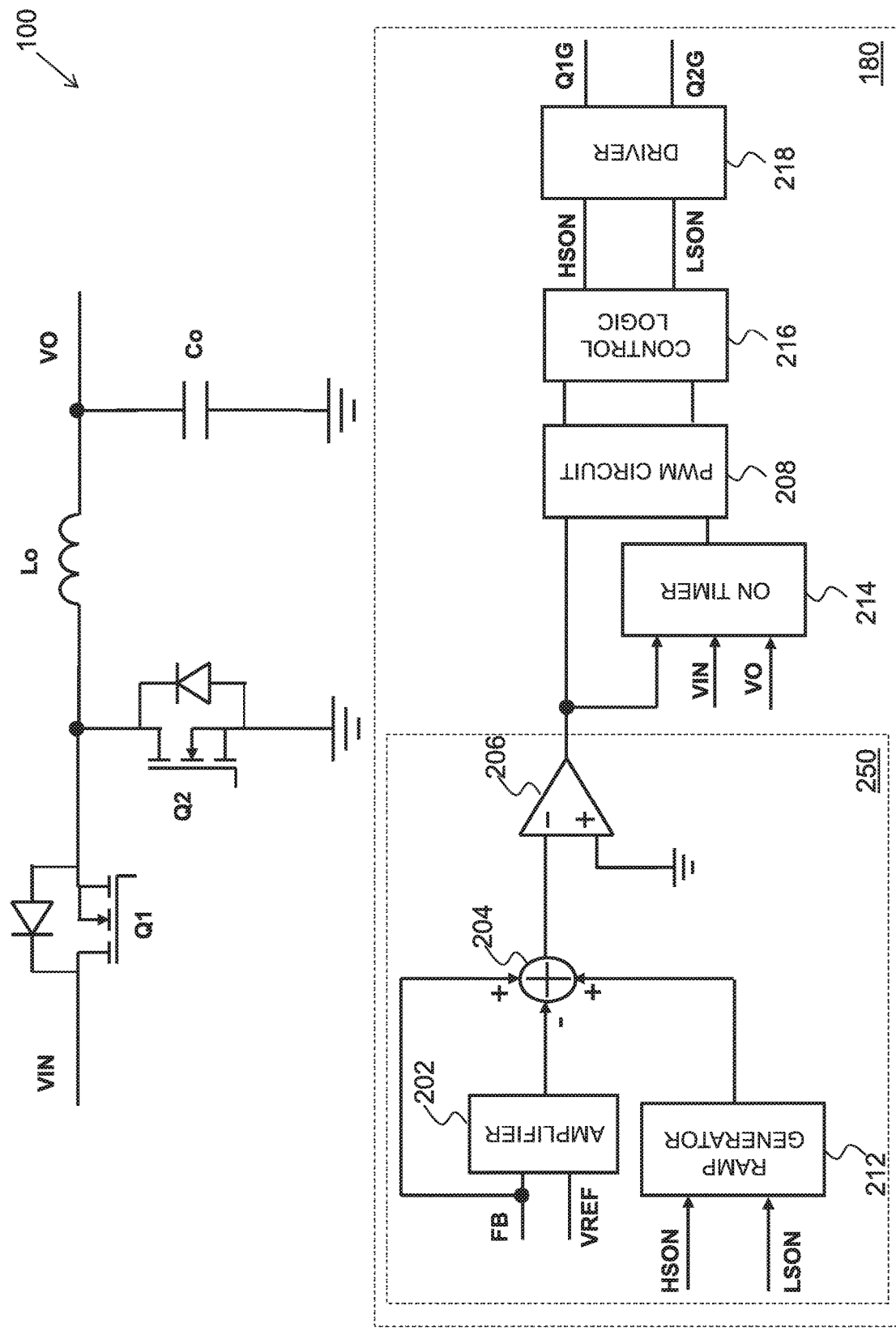
FIG. 2 illustrates a detailed block diagram of the control apparatus of the power converter shown in FIG. 1 in accordance with various embodiments of the present disclosure.

FIG. 2 illustrates a detailed block diagram of the control apparatus of the power converter shown in FIG. 1 in accordance with various embodiments of the present disclosure. The control apparatus 180 of the power converter 100 comprises an amplifier apparatus 202, a ramp generator 212, an adder 204, a comparator apparatus 206, an on-time control apparatus 214, a pulse width modulation (PWM) circuit 208, a control logic apparatus 216 and a driver apparatus 218.

The amplifier apparatus 202, the ramp generator 212, the adder 204 and the comparator apparatus 206 form a feedback control apparatus 250. In some embodiments, the feedback control apparatus 250 is used to monitor the output voltage of the power converter 100. The input signal FB of the amplifier apparatus 202 is a signal proportional to the output voltage of the power converter 100.

According to the operating principle of constant on-time power converters, the feedback control apparatus 250 is employed to turn on the high-side switch Q1 when the detected output voltage is below a predetermined reference (e.g., VREF in FIG. 2). More particularly, the turn-on signal of the high-side switch Q1 is generated through applying a logic high signal to a first input of the PWM circuit 208 (e.g., a set input of a latch). After the high-side switch Q1 has been turned on, the turn-off of the high-side switch Q1 is determined by the on-time control apparatus 214. The turn-off signal of the high-side switch Q1 is generated through applying a logic high signal to a second input of the PWM circuit 208 (e.g., a reset input of a latch). The detailed operation principles of the feedback control apparatus 250 and the on-time control apparatus 214 will be described below with respect to FIGS. 3-6.

The control logic apparatus 216 has an input connected to an output of the PWM circuit 208. In some embodiments, the control logic apparatus 216 is employed to generate the high-side drive signal and the low-side drive signal based upon the output signal/signals of the PWM circuit 208. Furthermore, the control logic apparatus 216 may be used to produce special features for the high-side drive signal and the low-side drive signal. For example, the control logic apparatus 216 may insert small amount of time between the high-side drive signal and the low-side drive signal. The small amount of time is known as the dead-time between the high-side drive signal and the low-side drive signal.

The control logic apparatus 216 has two outputs. A first output provides a gate drive signal for the high-side switch Q1. The first output signal of the control logic apparatus 216 is defined as HSON as shown in FIG. 2. A second output provides a gate drive signal for the low-side switch Q2. The second output signal of the control logic apparatus 216 is defined as LSON as shown in FIG. 2.

The driver apparatus 218 is employed to provide high speed and high current drive capability for the power converter 100. In some embodiments, the driver apparatus 218 may further comprise a level-shifting circuit for driving an n-channel high-side switch (e.g., the high-side switch Q1).

The driver apparatus 218 has two outputs. A first output is connected to the gate of the high-side switch Q1. The first output signal of the driver apparatus 218 is defined as Q1G as shown in FIG. 2. A second output is connected to the gate of the low-side switch Q2. The second output signal of the driver apparatus 218 is defined as Q2G as shown in FIG. 2.

Figure 3:
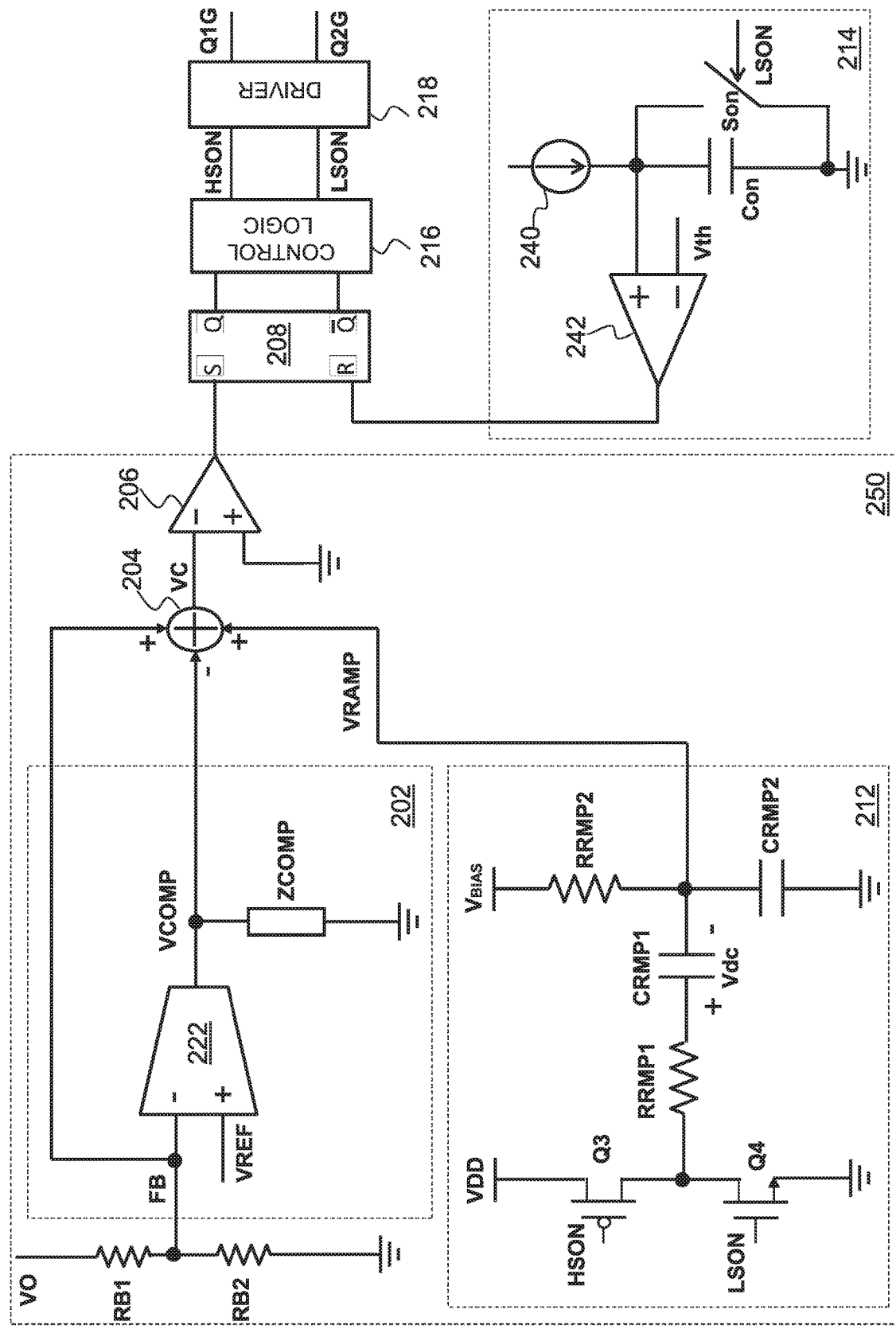
FIG. 3 illustrates a schematic diagram of a first implementation of the feedback control apparatus and the on-time control apparatus shown in FIG. 2 in accordance with various embodiments of the present disclosure.

FIG. 3 illustrates a schematic diagram of a first implementation of the feedback control apparatus and the on-time control apparatus shown in FIG. 2 in accordance with various embodiments of the present disclosure. The feedback control apparatus 250 comprises the amplifier apparatus 202 and the ramp generator 212. As shown in FIG. 3, the amplifier apparatus 202 comprises a trans-conductance amplifier 222 and a compensation network ZCOMP. Throughout the description, the trans-conductance amplifier may be alternatively referred to as a gm amplifier. The compensation network ZCOMP may comprise a plurality of resistors and capacitors (e.g., a resistor and a capacitor connected in series). The compensation network ZCOMP is employed to provide adequate phase margin so as to further improve the stability of the power converter 100.

As shown in FIG. 3, an inverting input of the trans-conductance amplifier 222 is connected to a voltage divider formed by resistors RB1 and RB2. More particularly, the inverting input of the trans-conductance amplifier 222 is connected to a common node of resistors RB1 and RB2. A non-inverting input of the trans-conductance amplifier 222 is connected to a reference VREF. The reference VREF has a predetermined value (e.g., 0.8 V). Depending on different applications and design needs, the reference VREF may vary accordingly.

The ramp generator 212 comprises a first ramp generation switch Q3, a second ramp generation switch Q4, a first ramp resistor RRMP1, a first ramp capacitor CRMP1, a second ramp resistor RRMP2 and a second ramp capacitor CRMP2. As shown in FIG. 3, the first ramp generation switch Q3 and the second ramp generation switch Q4 are connected in series between a first bias voltage VDD and ground. In some embodiments, the first ramp generation switch Q3 is implemented as a p-type transistor as shown in FIG. 3. The second ramp generation switch Q4 is implemented as an n-type transistor. The gates of the first ramp generation switch Q3 and the second ramp generation switch Q4 are connected to the high-side gate drive signal HSON and the low-side gate drive signal LSON, respectively.

The second ramp resistor RRMP2 and the second ramp capacitor CRMP2 are connected in series between a second bias voltage VBIAS and ground. The first ramp resistor RRMP1 and the first ramp capacitor CRMP1 are connected in series between a common node of the first ramp generation switch Q3 and the second ramp generation switch Q4, and a common node of the second ramp resistor RRMP2 and the second ramp capacitor CRMP2.

In some embodiments, the voltage level of the first bias voltage VDD is approximately equal to the voltage level of the second bias voltage VBIAS. In alternative embodiments, the voltage level of the first bias voltage VDD is different from the voltage level of the second bias voltage VBIAS. For example, the first bias voltage VDD is equal to 3.3 V. The second bias voltage VBIAS is equal to 1.2 V. It should be noted that the voltages (3.3 V and 1.2 V) described above are merely an example. A person skilled in the art would understand there may be many variations, modifications and alternatives.

In operation, the gate of the first ramp generation switch Q3 is driven by the high-side gate drive signal HSON. The gate of the second ramp generation switch Q4 is driven by the low-side gate drive signal LSON. The voltage across the first ramp capacitor CRMP1 is approximately equal to the first bias voltage VDD times the duty cycle (D) of the power converter 100. The voltage across the first ramp capacitor CRMP1 is defined as Vdc as shown in FIG. 3. When the first ramp generation switch Q3 is turned on and the second ramp generation switch Q4 is turned off, the first bias voltage VDD is configured to charge the second ramp capacitor CRMP2. The current flowing into the second ramp capacitor CRMP2 may be given by the following equations:

$$I_{CHARGE} = \frac{VDD - V_{dc}}{RRMP1} \quad (1)$$

$$I_{CHARGE} = \frac{VDD - D \cdot VDD}{RRMP1} \quad (2)$$

On the other hand, when the first ramp generation switch Q3 is turned off and the second ramp generation switch Q4 is turned on, the second ramp capacitor CRMP2 is discharged by the turned-on switch Q4. The current flowing out of the second ramp capacitor may be given by the following equation:

$$I_{DISCHARGE} = \frac{D \cdot VDD}{RRMP1} \quad (3)$$

The ramp signal VRAMP of the ramp generator 212 is the voltage across the second ramp capacitor CRMP2. The amplitude of the ramp signal is proportional to the product of the charge current and the charge time. As indicated by Equation (2), the charge current of the second ramp capacitor CRMP2 is related to the duty cycle of the power converter 100. More particularly, the charge current is reduced as the duty cycle of the power converter 100 increases. On the other hand, the charge time is proportional to the duty cycle of the power converter 100. As such, the amplitude of the ramp may reach its maximum value when the duty cycle of the power converter 100 is about 50%. When the power converter 100 operates in a high duty cycle (e.g., 90%) or a low duty cycle (e.g., 10%), the amplitude of the ramp is reduced accordingly. The detailed duty cycle/ramp amplitude relationship will be described below with respect to FIG. 4.

The adder 204 has three inputs as shown in FIG. 3. A first input of the adder 204 is connected to the common node of the resistors RB1 and RB2. The voltage at the common node of the resistors RB1 and RB2 is defined as FB as shown in FIG. 3. It should be noted that detecting the output voltage of the power converter 100 through a divider is merely an example. A person skilled in the art would understand there may be many variations, modifications and alternatives. For example, FB may be detected directly from the output voltage of the power converter 100.

A second input of the adder 204 is connected to the output of the trans-conductance amplifier 222 through an inverter. The voltage at the output of the trans-conductance amplifier 222 is defined as VCOMP. A third input of the adder 204 is configured to receive the ramp signal VRAMP. The output of the adder 204 may be given by the following equation:

$$VC = FB + VRAMP - VCOMP \quad (4)$$

The comparator apparatus 206 is implemented a comparator. Throughout the description, the comparator apparatus 206 is alternatively referred to as a comparator 206. The comparator 206 has an inverting input connected to the output of the adder 204 and a non-inverting input connected to ground. It should be noted that connecting the non-inverting input connected to ground is merely an example. Depending on design needs and different applications, the non-inverting input of the comparator 206 may be connected to a predetermined reference voltage.

In some embodiments, the PWM circuit 208 is implemented as an R-S latch as shown in FIG. 3. Throughout the description, the PWM circuit 208 may be alternatively referred to as the latch 208. The set input of the latch 208 is connected to an output of the comparator 206. The reset input of the latch 208 is connected to an output of the on-time control apparatus 214. The outputs of the latch 208 are connected to the gates of the switches Q1 and Q2 through the control logic apparatus 216 and the driver apparatus 218.

The Q output of the latch 208 is connected to the gate of the high-side switch Q1 through the control logic apparatus 216. The output of the control logic apparatus 216 corresponding to the Q output of the latch 208 is HSON. The Q-bar output (the inverse of the Q output) of the latch 208 is connected to the gate of the low-side switch Q2 through the control logic apparatus 216. The output of the control logic apparatus 216 corresponding to the Q-bar output of the latch 208 is LSON.

According to the operating principle of the R-S latch, the output of the feedback control apparatus 250 determines the turn-on edge or the leading edge of the gate drive signal applied to the high-side switch Q1. The output of the on-time control apparatus 214 determines the turn-off edge or the trailing edge of the gate drive signal applied to the high-side switch Q1.

The on-time control apparatus 214 includes a current source 240, a capacitor Con, a switch Son and a comparator 242. In some embodiments, the current source 240 may be coupled to the input voltage VIN. Furthermore, the current level of the current source 240 is proportional to the input voltage VIN. In some embodiments, the current level of the current source 240 may be equal to the input voltage VIN divided by a predetermined resistor. The voltage across the capacitor Con is fed into a non-inverting input of the comparator 242. The inverting input of the comparator 242 is connected to a predetermined reference Vth.

In operation, when the high-side switch Q1 is turned on, a logic level "1" and a logic level "0" are applied to the set input and the reset input of the R-S latch 208 respectively. The logic level "0" turns off the switch Son. As a result of turning off the switch Son, the current source 240 starts to charge the capacitor Con in a linear manner. The voltage across the capacitor Con is compared with the predetermined reference Vth at the comparator 242. After the voltage across the capacitor Con reaches the voltage of the predetermined reference Vth, the output of the comparator 242 generates a logic level "1" which generates a logic level "0" at the Q output and a logic level "1" at the Q-bar output of the R-S latch 208. The logic level "0" at the Q output is used to turn off the high-side switch Q1. The logic level "1" at the Q-bar output is used to turn on the low-side switch Q2. As shown in FIG. 3, the logic level "1" at the Q-bar output is also used to turn on the switch Son. The turned-on switch Son discharges the capacitor Con and maintains the voltage across the capacitor Con equal to about zero. As such, the voltage across the capacitor Con is a voltage ramp. This voltage ramp is in sync with the gate drive signal applied to the high-side switch Q1. In other words, the voltage ramp starts from zero and linearly rises during the turn-on time of the high-side switch Q1. The voltage ramp goes back to zero at the trailing edge of the gate drive signal applied to the high-side switch Q1.

Figure 4:
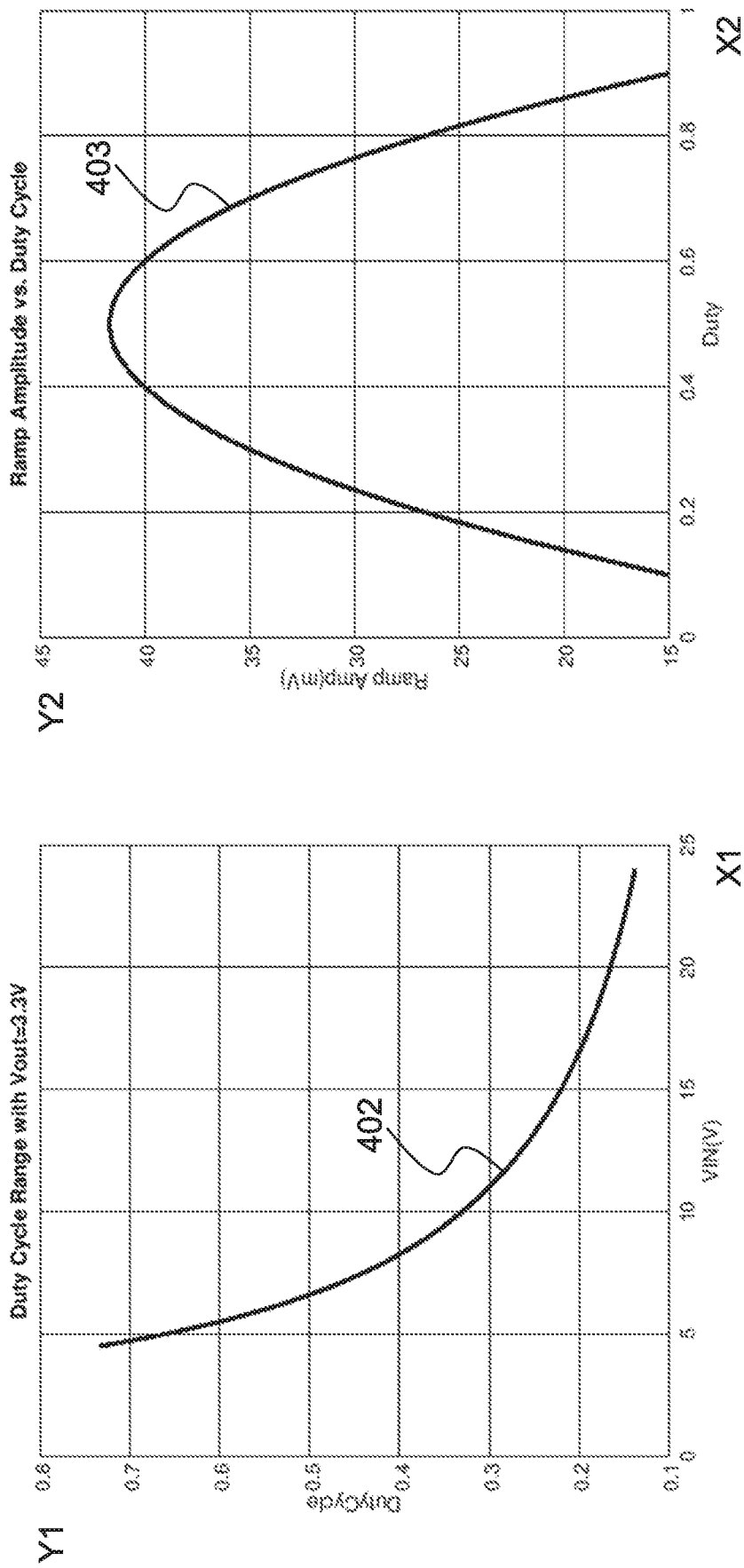
FIG. 4 are duty-voltage and ramp-duty curves illustrating the operating principle of the power converter shown in FIG. 2 in accordance with various embodiments of the present disclosure.

FIG. 4 are duty-voltage and ramp-duty curves illustrating the operating principle of the power converter shown in FIG. 2 in accordance with various embodiments of the present disclosure. The first horizontal axis X1 of FIG. 4 represents the input voltage VIN of the power converter 100. The unit of the first horizontal axis X1 is Volt. The first vertical axis Y1 represents the duty cycle of the power converter 100. The second horizontal axis X2 of FIG. 4 represents the duty cycle of the power converter 100. The second vertical axis Y2 represents the ramp amplitude (amplitude of VRAMP) of the power converter 100. The unit of the second vertical axis Y2 is millivolt.

As shown in FIG. 4, the curve 402 indicates there is a non-linear relationship between the input voltage VIN of the power converter 100 and the duty cycle D when the power converter 100 is regulated to an output voltage of 3.3 V. As shown in FIG. 4, when the input voltage is about 4.5 V, the duty cycle of the power converter 100 is about 0.75 (75%). When the input voltage is about 24 V, the duty cycle of the power converter 100 is about 0.15 (15%). In other words, the duty cycle of the power converter 100 is in a wider range from about 0.15 to about 0.75. Referring back to Equation (2) above, the charge current of the ramp capacitor may vary in a wide range as a result of having a duty cycle varying in a wide range. Such charge current variations may cause larger ramp amplitude fluctuations under different operation conditions.

Figure 5:
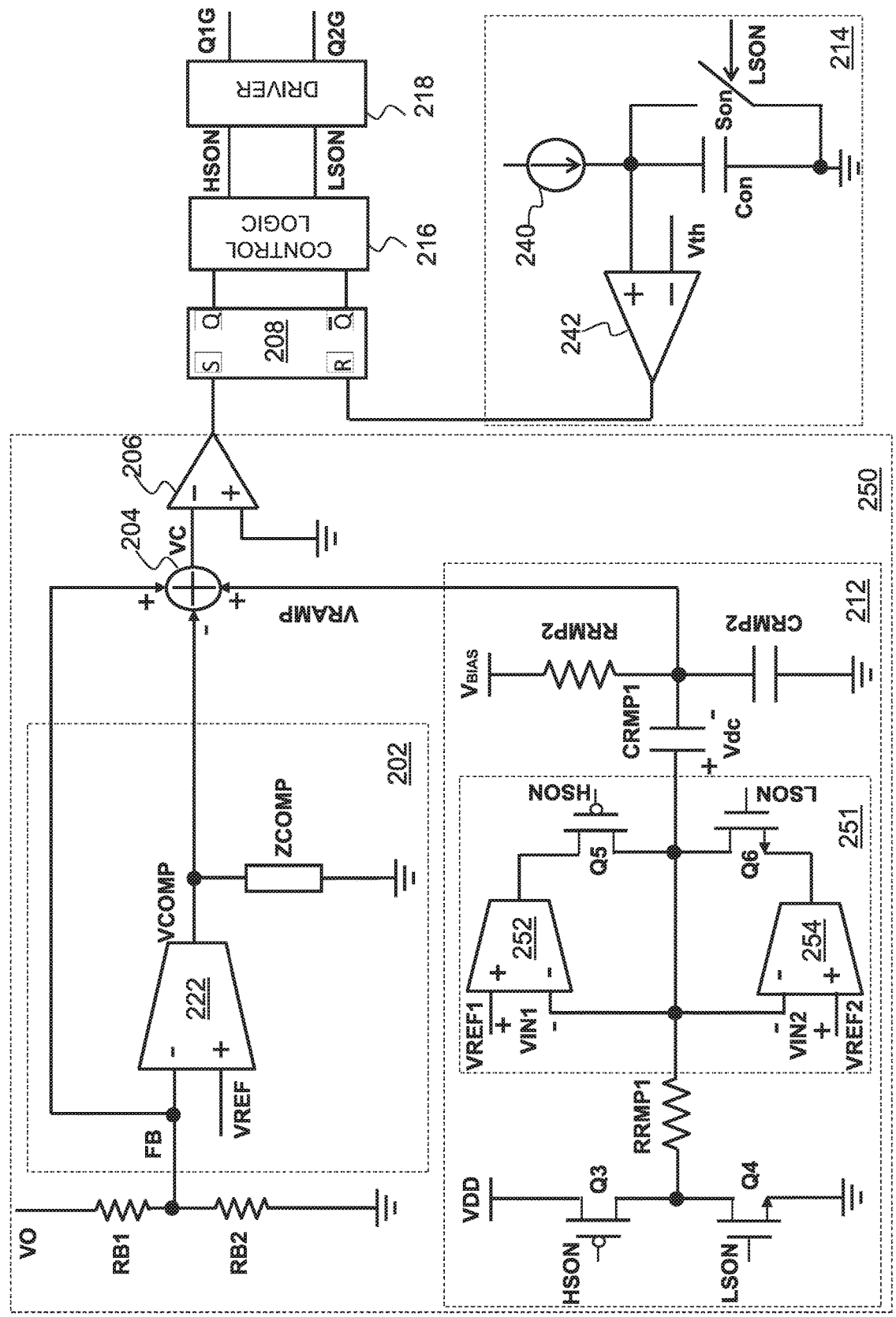
FIG. 5 illustrates a schematic diagram of a second implementation of the feedback control apparatus and the on-time control apparatus shown in FIG. 2 in accordance with various embodiments of the present disclosure.

The curve 403 shows the ramp amplitude variations under different operation conditions. As shown in FIG. 4, when the duty cycle of the power converter 100 is about 0.5 (50%), the ramp amplitude reaches its maximum value, which is about 42 mV. The ramp amplitude is reduced significantly when the power converter 100 operates in either a high duty cycle or a low duty cycle. In order to improve the performance such as stability and fast transient responses, a consistent ramp amplitude is desirable. FIG. 5 illustrates a ramp adjustment apparatus configured to maintain the ramp amplitude the same or in a narrow range under different operating conditions.

FIG. 5 illustrates a schematic diagram of a second implementation of the feedback control apparatus and the on-time control apparatus shown in FIG. 2 in accordance with various embodiments of the present disclosure. The feedback control apparatus 250 shown in FIG. 5 is similar to that shown in FIG. 3 except that the ramp generator 212 comprises a ramp adjustment apparatus 251 for maintaining the ramp amplitude the same or in a narrow range under different operating conditions.

As shown in FIG. 5, the ramp adjustment apparatus 251 is connected to a common node of the first ramp resistor RRMP1 and the first ramp capacitor CRMP1. The ramp adjustment apparatus 251 comprises a first amplifier 252, a second amplifier 254, a fifth switch Q5 and a sixth switch Q6. In some embodiments, both the first amplifier 252 and the second amplifier 254 are implemented as gm amplifiers as shown in FIG. 5.

As shown in FIG. 5, an inverting input of the first amplifier 252 is connected to an inverting input of the second amplifier and further connected to the common node of the first ramp resistor RRMP1 and the first ramp capacitor CRMP1. A non-inverting input of the first amplifier 252 is configured to be connected with a first reference VREF1. A non-inverting input of the second amplifier 254 is configured to be connected with a second reference VREF2. The fifth switch Q5 and the sixth switch Q6 are connected in series between the output of the first amplifier 252 and the output of the second amplifier 254. The gate of the fifth switch Q5 is connected to the high-side gate drive signal HSON. The gate of the sixth switch Q6 is connected to the low-side gate drive signal LSON. Furthermore, a common node of the fifth switch Q5 and the sixth switch Q6 is connected to the common node of the first ramp resistor RRMP1 and the first ramp capacitor CRMP1.

In operation, the first reference VREF1 is used to set the lowest value of the dc voltage level of Vdc. The second reference VREF2 is used to set the highest value of the dc voltage level of Vdc. In some embodiments, when the first reference VREF1 is equal to the second reference VREF2, the dc voltage level of Vdc is maintained the same under different operating conditions (e.g., duty cycle varying from 0.15 to 0.75). On the other hand, when the first reference VREF1 is different from the second reference VREF2, the dc voltage level of Vdc is controlled within a narrow range under different operating conditions (e.g., duty cycle varying from 0.15 to 0.75). The upper limit of the narrow range is approximately equal to the second reference VREF2. The lower limit of the narrow range is approximately equal to the first reference VREF1.

In operation, the first amplifier 252 and the second amplifier 254 are configured to supply an extra charge current from an output of the first amplifier 252 to the first ramp capacitor CRMP1 and the second ramp capacitor CRMP2 when a dc voltage level of Vdc is less than the first reference VREF1. The first amplifier 252 and the second amplifier 254 are configured to provide an extra discharge current flowing from the first ramp capacitor CRMP1 and the second ramp capacitor CRMP2 to the output of the second amplifier 254 when the dc voltage level of Vdc is greater than the second reference VREF2. By employing the ramp adjustment apparatus 251, the dc voltage level of Vdc is controlled within a range having an upper limit equal to VREF2 and a lower limit equal to VREF1. Referring back to Equations (2) and (3), the dc voltage level of Vdc in a narrow range helps to reduce the charge/discharge current fluctuations, thereby maintaining the amplitude of the ramp within a narrow range under different operating conditions.

One advantageous feature of having the ramp adjustment apparatus 251 is the amplitude of the ramp is maintained in a narrow range under different operating conditions. Such a narrow ramp amplitude range helps to improve the performance of the power converter 100. For example, with the ramp adjustment apparatus 251, the power converter 100 is able to achieve both stable operations and fast transient responses under various operation conditions.

Figure 6:
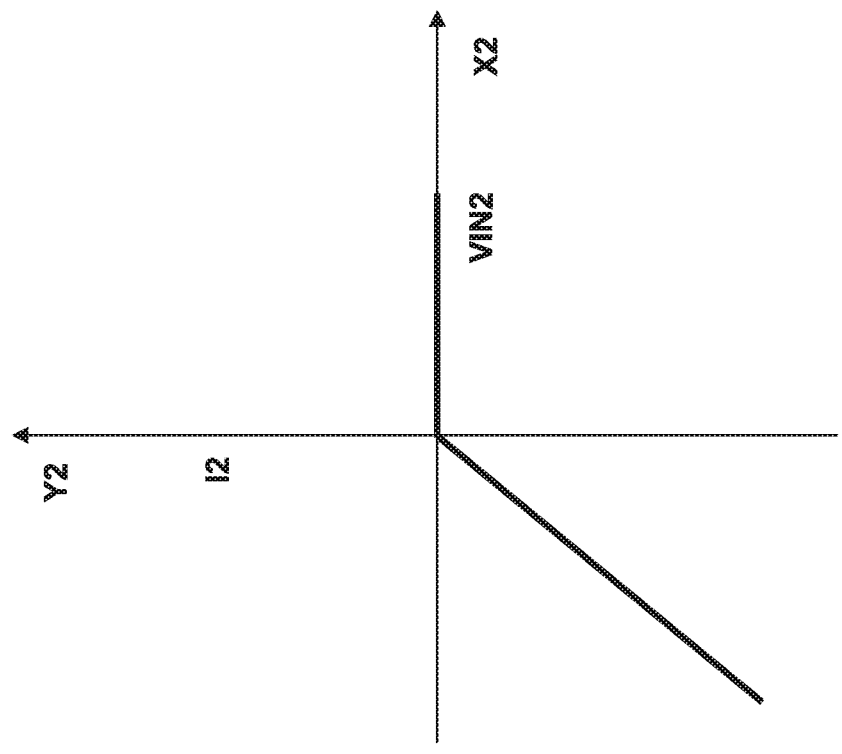
FIG. 6 is an amplifier current-voltage chart illustrating the operating principle of the amplifiers shown in FIG. 5 in accordance with various embodiments of the present disclosure.
Figure 6:
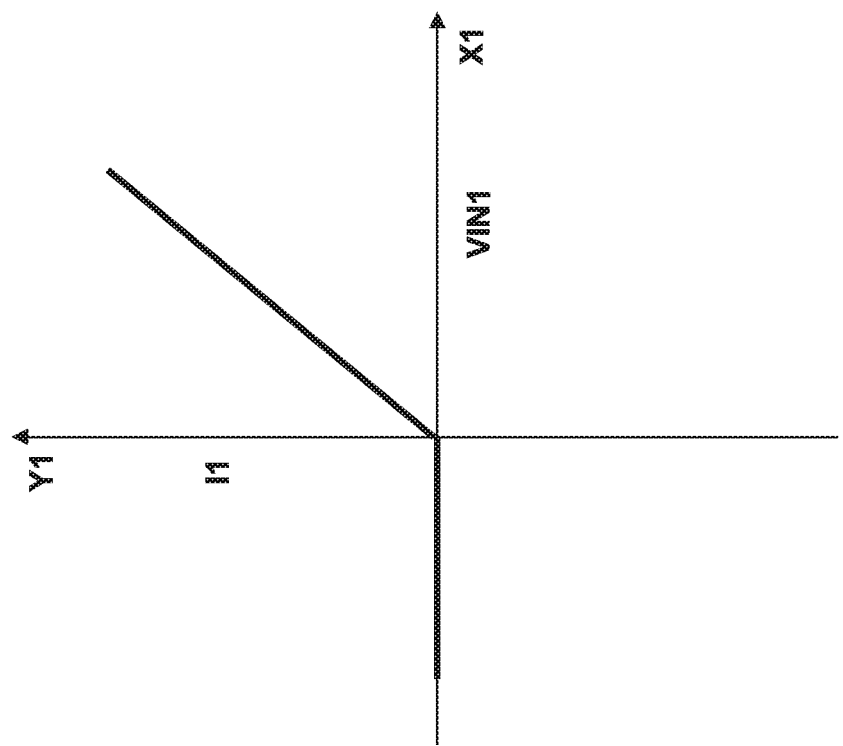

FIG. 6 is an amplifier current-voltage chart illustrating the operating principle of the amplifiers shown in FIG. 5 in accordance with various embodiments of the present disclosure. There may be two vertical axes and two horizontal axes. The first vertical axis Y1 represents the output current of the first amplifier 252 shown in FIG. 5. The second vertical axis Y2 represents the output current of the second amplifier 254 shown in FIG. 5. The first horizontal axis X1 represents the input voltage of the first amplifier 252 shown in FIG. 5. The input voltage VIN1 of the first amplifier 252 is defined as the voltage difference between the non-inverting input and the inverting input of the first amplifier 252 as shown in FIG. 5. The second horizontal axis X2 represents the input voltage of the second amplifier 254 shown in FIG. 5. The input voltage VIN2 of the second amplifier 254 is defined as the voltage difference between the non-inverting input and the inverting input of the second amplifier 254 as shown in FIG. 5.

In operation, when the input voltage VIM of the first amplifier 252 is less than zero, the output current I1 of the first amplifier 252 is equal to zero. The first amplifier 252 does not have an impact on the dc voltage level of Vdc. When the input voltage VIN1 of the first amplifier 252 is greater than zero, the output current I1 of the first amplifier 252 is proportional to the input voltage VIN1. The output current I1 functions as an extra charge current for increasing the dc voltage level of Vdc.

In operation, when the input voltage VIN2 of the second amplifier 254 is less than zero, the output current I2 of the second amplifier 254 is proportional to the input voltage VIN2. The output current I2 functions as an extra discharge current for reducing the dc voltage level of Vdc. When the input voltage VIN2 of the second amplifier 254 is greater than zero, the output current I2 of the second amplifier 254 is equal to zero. The second amplifier 254 does not have an impact on the dc voltage level of Vdc.

Figure 7:
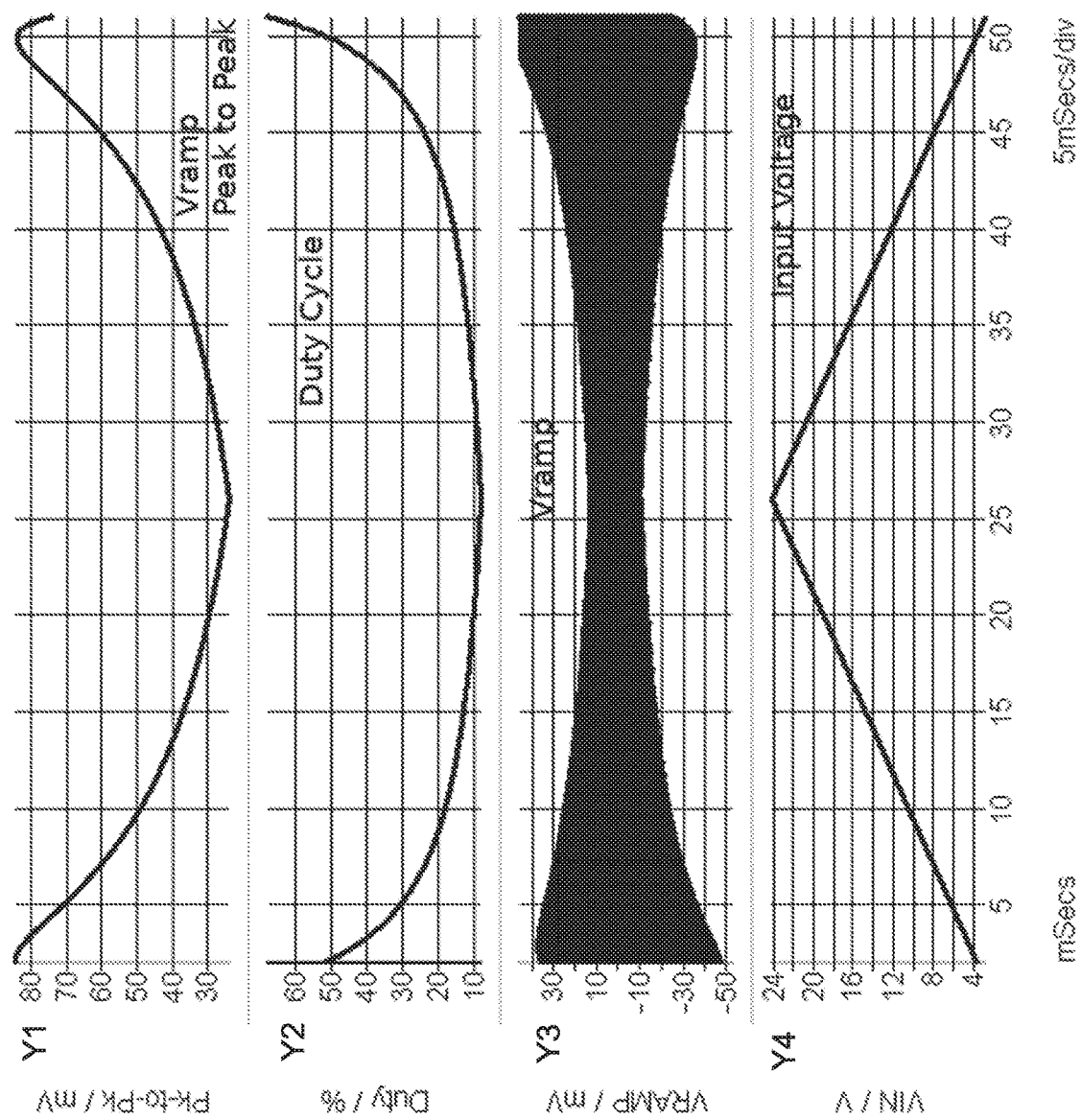
FIG. 7 illustrates waveforms of the power converter without having an adjustable ramp in accordance with various embodiments of the present disclosure.

FIG. 7 illustrates waveforms of the power converter without having an adjustable ramp in accordance with various embodiments of the present disclosure. The horizontal axis of FIG. 7 represents intervals of time. The unit of the horizontal axis is millisecond. There may be four vertical axes. The first vertical axis Y1 represents the peak-to-peak value of the ramp VRAMP. The second vertical axis Y2 represents the duty cycle of the power converter 100. The third vertical axis Y3 represents the ramp VRAMP. The fourth vertical axis Y4 represents the input voltage of the power converter 100.

The power converter 100 does not comprise the ramp adjustment apparatus 251 shown in FIG. 5. As shown in FIG. 7, the duty cycle and the input voltage has a non-linear relationship. The input voltage is in a range from 3 V to 24 V. The output voltage is regulated to 1.8 V. The corresponding duty cycle is in a range from about 0.09 (9%) to about 0.7 (70%). Without having the ramp adjustment apparatus 251, the peak-to-peak value of the ramp VRAMP varies in a wide range from about 20 mV to about 80 mV.

Figure 8:
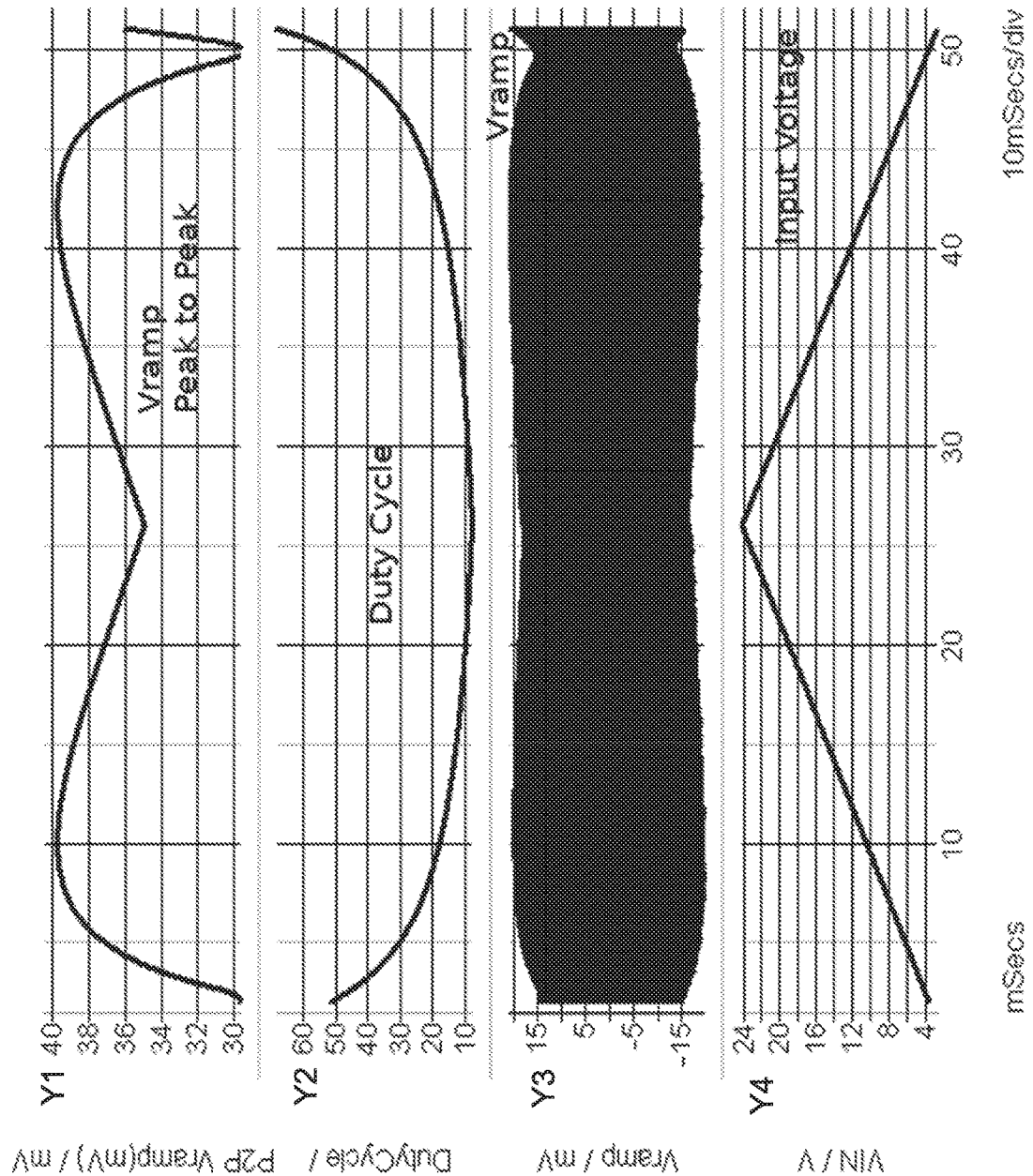
FIG. 8 illustrates waveforms of the power converter having an adjustable ramp in accordance with various embodiments of the present disclosure.

FIG. 8 illustrates waveforms of the power converter having an adjustable ramp in accordance with various embodiments of the present disclosure. The horizontal axis of FIG. 8 represents intervals of time. The unit of the horizontal axis is millisecond. There may be four vertical axes. The first vertical axis Y1 represents the peak-to-peak value of the ramp VRAMP. The second vertical axis Y2 represents the duty cycle of the power converter 100. The third vertical axis Y3 represents the ramp VRAMP. The fourth vertical axis Y4 represents the input voltage of the power converter 100.

As shown in FIG. 8, the non-linear relationship of duty cycle and the input voltage is similar to that shown in FIG. 7. Under similar operating conditions, with the help of the ramp adjustment apparatus 251, the peak-to-peak value of the ramp VRAMP varies in a narrow range from about 30 mV to about 40 mV.

Figure 9:
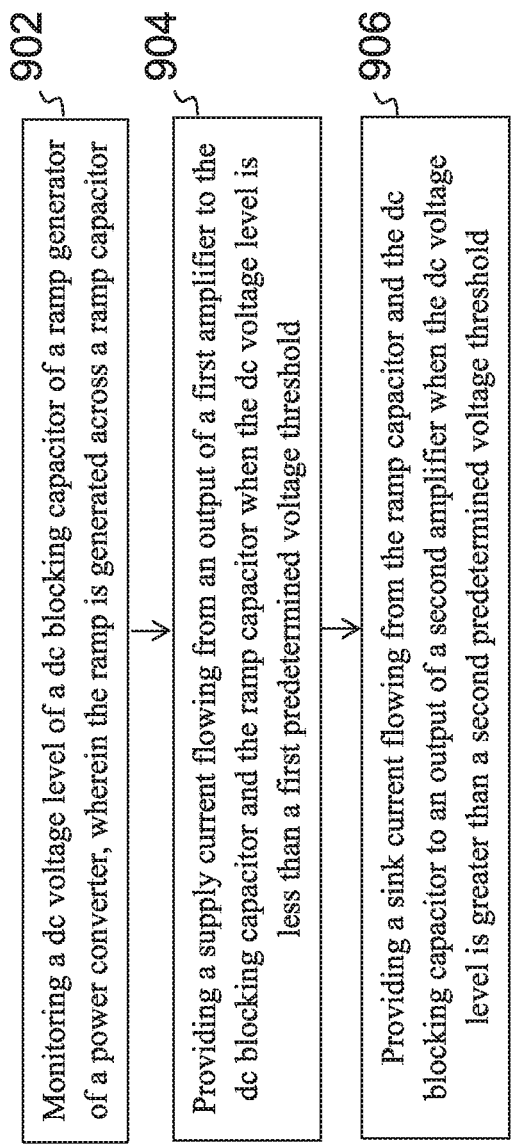
FIG. 9 illustrates a flow chart of a method for controlling the power converter shown in FIG. 2 in accordance with various embodiments of the present disclosure.

FIG. 9 illustrates a flow chart of a method for controlling the power converter shown in FIG. 2 in accordance with various embodiments of the present disclosure. This flowchart shown in FIG. 9 is merely an example, which should not unduly limit the scope of the claims. One of ordinary skill in the art would recognize many variations, alternatives, and modifications. For example, various steps illustrated in FIG. 9 may be added, removed, replaced, rearranged and repeated.

At step 902, the dc voltage level of a dc blocking capacitor of a ramp generator of the power converter 100 is monitored by a ramp adjustment apparatus. More particularly, the ramp adjustment apparatus comprises a first amplifier and a second amplifier. An inverting input of the first amplifier and an inverting input of the second amplifier are used to monitor the dc voltage level of the dc blocking capacitor.

At step 904, when the dc voltage level of the dc blocking capacitor is less than a first predetermined voltage threshold, the first amplifier provides a supply current flowing from an output of the first amplifier to the dc blocking capacitor and the ramp capacitor. The current from the first amplifier helps to increase the dc voltage level of the dc blocking capacitor so as to maintain the dc voltage level of the dc blocking capacitor over the first predetermined voltage threshold.

At step 906, when the dc voltage level of the dc blocking capacitor is greater than a second predetermined voltage threshold, the second amplifier provides a sink current flowing from the ramp capacitor and the dc blocking capacitor to an output of the second amplifier. The current from the second amplifier helps to reduce the dc voltage level of the dc blocking capacitor so as to maintain the dc voltage level of the dc blocking capacitor below the second predetermined voltage threshold.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A device comprising:
   a first switch and a second switch connected in series between a bias power supply and ground;
   a first ramp resistor, a first ramp capacitor and a second ramp capacitor connected in series between a common node of the first switch and the second switch and ground; and
   a ramp adjustment apparatus directly connected to a common node of the first ramp resistor and the first ramp capacitor, wherein the ramp adjustment apparatus is configured to adjust an amplitude of a ramp across the second ramp capacitor.

2. The device of claim 1, wherein:
   the ramp adjustment apparatus comprises a first amplifier, a second amplifier, a third switch and a fourth switch.

3. The device of claim 2, wherein the first amplifier and the second amplifier are configured to:
   supply a current from an output of the first amplifier to the first ramp capacitor and the second ramp capacitor when a dc voltage of the first ramp capacitor is less than a first predetermined threshold; and
   sink a current from the first ramp capacitor and the second ramp capacitor to an output of the second amplifier when the dc voltage of the first ramp capacitor is greater than a second predetermined threshold.

4. The device of claim 2, wherein:
   an inverting input of the first amplifier is connected to an inverting input of the second amplifier;
   a non-inverting input of the first amplifier is configured to be connected with a first reference;
   a non-inverting input of the second amplifier is configured to be connected with a second reference; and
   the third switch and the fourth switch are connected in series between an output of the first amplifier and an output of the second amplifier, and wherein a common node of the third switch and the fourth switch is connected to a common node of the first ramp resistor and the first ramp capacitor.

5. The device of claim 2, wherein:
the third switch is a p-type transistor; and
the fourth switch is an n-type transistor.

6. The device of claim 2, wherein:
the first amplifier and the second amplifier are gm amplifiers.

7. The device of claim 2, wherein:
the second ramp capacitor is configured to provide a ramp for a step-down power converter, and wherein:
the first switch and the third switch are driven by a high-side gate drive signal of the step-down power converter; and
the second switch and the fourth switch are driven by a low-side gate drive signal of the step-down power converter.

8. The device of claim 7, wherein:
the first ramp capacitor is configured to be a dc blocking capacitor, and wherein a current flowing through the second ramp capacitor is adjustable through adjusting a voltage across the first ramp capacitor.

9. A method comprising:
monitoring a direct current (dc) voltage level of a dc blocking capacitor of a ramp generator of a power converter, wherein a ramp of the power converter is generated across a ramp capacitor of the ramp generator;
providing a supply current flowing from an output of a first amplifier to the dc blocking capacitor and the ramp capacitor through a first auxiliary switch when the dc voltage level of the dc blocking capacitor is less than a first predetermined voltage threshold; and
providing a sink current flowing from the ramp capacitor and the dc blocking capacitor to an output of a second amplifier through a second auxiliary switch when the dc voltage level of the dc blocking capacitor is greater than a second predetermined voltage threshold.

10. The method of claim 9, wherein the power converter comprises:
a first switch and a second switch connected in series between an input power source and ground; and
an inductor connected between a common node of the first switch and the second switch, and an output capacitor.

11. The method of claim 10, further comprising:
generating an on-time signal through a constant on-time generator;
comparing a feedback signal proportional to an output voltage of the power converter with a reference signal to generate a comparison signal;
generating a control signal based upon the feedback signal, the comparison signal and the ramp; and
generating a turn-on signal applied to the first switch based on a comparison between the control signal and a reference.

12. The method of claim 11, wherein:
the control signal is obtained by adding the feedback signal and the ramp and subtracting the comparison signal from a sum of the feedback signal and the ramp.

13. The method of claim 9, further comprising:
under a high duty cycle operation condition, increasing the sink current flowing from the ramp capacitor and the dc blocking capacitor to the output of the second amplifier; and under a low duty cycle operation condition, increasing the supply current flowing from the output of the first amplifier to the dc blocking capacitor and the ramp capacitor.

14. The method of claim 9, wherein the ramp generator comprises:
a first ramp generation switch and a second ramp generation switch connected in series between a bias power supply and ground;
a first ramp resistor and a first ramp capacitor connected in series;
a second ramp resistor and a second ramp capacitor connected in series between a common node of the first ramp resistor and the first ramp capacitor, and a common node of the first ramp generation switch and the second ramp generation switch; and
a ramp adjustment apparatus connected to a common node of the second ramp resistor and the second ramp capacitor, wherein the ramp adjustment apparatus comprises the first amplifier, the second amplifier, the first auxiliary switch and the second auxiliary switch.

15. The method of claim 14, wherein:
an inverting input of the first amplifier is connected to an inverting input of the second amplifier;
a non-inverting input of the first amplifier is configured to be connected with a first reference; a non-inverting input of the second amplifier is configured to be connected with a second reference; and
the first auxiliary switch and the second auxiliary switch are connected in series between the output of the first amplifier and the output of the second amplifier, and wherein a common node of the first auxiliary switch and the second auxiliary switch is connected to a common node of the second ramp resistor and the second ramp capacitor.

16. A converter comprising:
a first switch and a second switch connected in series between an input power source and ground;
an inductor connected between a common node of the first switch and the second switch, and an output capacitor;
a control apparatus configured to generate gate drive signals for the first switch and the second switch, wherein the control apparatus comprises a feedback control apparatus and a ramp generator, wherein the ramp generator is configured to dynamically adjust an amplitude of a ramp to a different value based upon different operating conditions through providing either a supply current or a sink current to the ramp generator;
an on-time control generator; and
a latch having a set input configured to receive an output signal of the control apparatus and a reset input configured to receive an output signal of the on-time control generator.

17. The converter of claim 16, wherein:
the feedback control apparatus comprises a resistor divider connected between a positive terminal of the output capacitor and ground, a feedback amplifier having an inverting input connected to the resistor divider and a non-inverting input connected to a reference, and a compensation network connected to an output of the feedback amplifier.

18. The converter of claim 16, wherein the ramp generator comprises:
a first ramp generation switch and a second ramp generation switch connected in series between a bias power supply and ground;

a first ramp resistor and a first ramp capacitor connected in series, and wherein the ramp is generated across the first ramp capacitor;

a second ramp resistor and a second ramp capacitor connected in series between a common node of the first ramp resistor and the first ramp capacitor, and a common node of the first ramp generation switch and the second ramp generation switch; and a ramp adjustment apparatus connected to a common node of the second ramp resistor and the second ramp capacitor, wherein the ramp adjustment apparatus comprises a first amplifier, a second amplifier, a third ramp generation switch and a fourth ramp generation switch.

19. The converter of claim 18, wherein:

an inverting input of the first amplifier is connected to an inverting input of the second amplifier;

a non-inverting input of the first amplifier is configured to be connected with a first reference;

a non-inverting input of the second amplifier is configured to be connected with a second reference; and the third ramp generation switch and the fourth ramp generation switch are connected in series between an output of the first amplifier and an output of the second amplifier, and wherein a common node of the third ramp generation switch and the fourth ramp generation switch is connected to the common node of the second ramp resistor and the second ramp capacitor.

20. The converter of claim 18, wherein:

the first amplifier and the second amplifier are configure such that:

increasing a charging current of the first ramp capacitor and the second ramp capacitor by flowing a supply current from an output of a first amplifier to the first ramp capacitor and the second ramp capacitor when a dc voltage level of the second ramp capacitor is less than a first predetermined voltage threshold; and increasing a discharging current of the first ramp capacitor and the second ramp capacitor by flowing a sink current from the first ramp capacitor and the second ramp capacitor to an output of a second amplifier when the dc voltage level of the second ramp capacitor is greater than a second predetermined voltage threshold.

\* \* \* \* \*